BIREFRINGENCE OF COMPONENT X ($10^{-3}$)

FIG.10 FIG.12
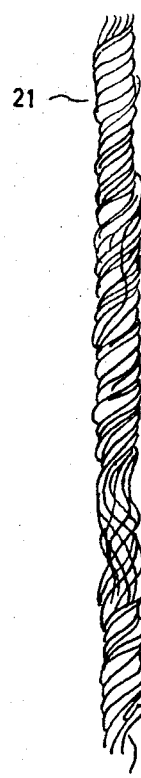
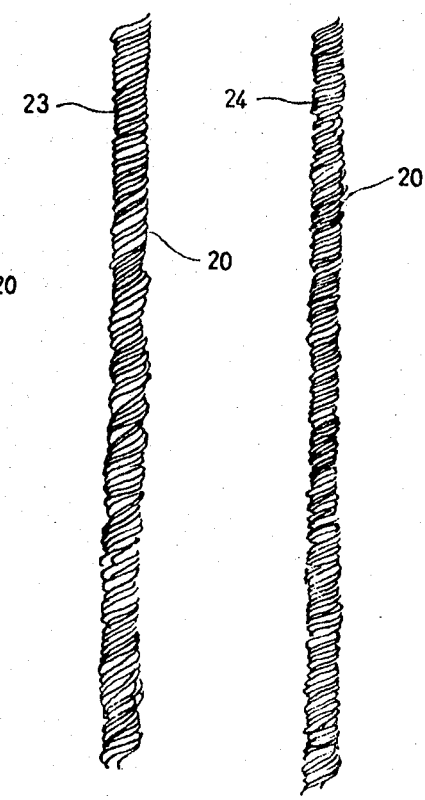
FIG.11 FIG.13

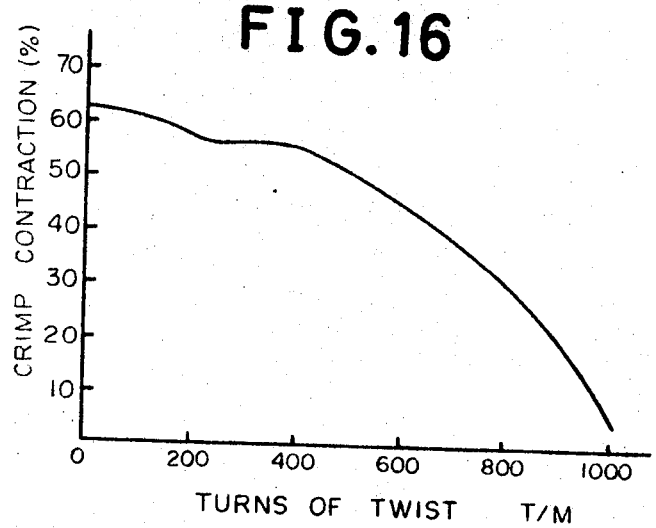

United States Patent Office 3,446,005
Patented May 27, 1969

3,446,005
HIGH ELASTIC CRIMPED FILAMENT YARN AND
ITS MANUFACTURING METHOD
Kenzo Kosaka, Masami Tsunewaki, Nobuaki Yonekura, and Tsutomu Okaya, Nagoya-shi, Ken Mimatsu, Toyohashi-shi, and Tatsujiro Mori, Nagoya-shi, Japan, assignors to Mitsubishi Rayon Co., Ltd., Tokyo, Japan, a company of Japan
Filed Aug. 3, 1966, Ser. No. 569,961
Claims priority, application Japan, Aug. 5, 1965, 40/47,165; Aug. 9, 1965, 40/48,370
Int. Cl. D01f 7/02; D02g 3/32, 1/20
U.S. Cl. 57—157
38 Claims

ABSTRACT OF THE DISCLOSURE

High elastic multi-filament synthetic yarn is produced by spinning a multi-filament of thermoplastic synthetic material, the multi-filament comprising individual composite fibers each composed of two different component thermoplastic materials extending as distinct filamentary components along the length of the filament in adhering relationship; drawing, twisting and aging the multi-filament, and thereafter subjecting the multi-filament to heat treatment in relaxed condition to develop longitudinally arranged uniform helically coiled crimps in each composite filament of the multi-filament to impart high elasticity to the yarn by the coil spring action of the helically coiled filaments.

---

Figures 1, 2, 3:
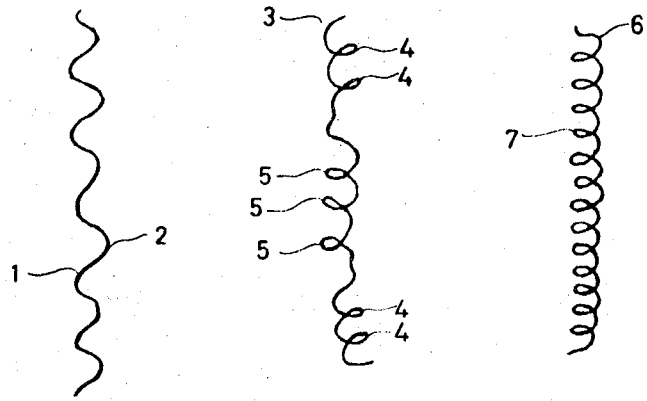

This invention relates to a synthetic filament yarn having superior elastic property and method for manufacturing the above-mentioned yarn, more particularly to an elastic filament yarn comprising plurality of helically coiled synthetic filament and methods for manufacturing the yarn.

In general, twisting-heat setting-untwisting method or twisting of single filament yarn—heat setting-doubling-untwisting method is applied for manufacturing so-called high elastic yarn, such as Helanca, Nefalcon, Woollie Nylon (trade names) or spring yarn. The above-mentioned mehtods are popular but it is well known that they are not economical because of their low productivity.

The principal object of the present invention is to provide high elastic yarn comprising plurality of helically coiled synthetic filaments.

A further object of the invention is to provide a novel method for manufacturing high elastic yarn having high bulkiness comprising plurality of helically coiled synthetic filaments.

A still further object of the invention is to provide a novel method for manufacturing yarn having excellent elasticity and uniform crimpness at low production cost and high production efficiency.

Other objects will be apparent from the description of the invention given hereinafter.

The above objects are obtained according to the present invention by using synthetic filament having a potentially crimpable property in which crimps are developed by suitable treatment in a relaxed condition.

In a preferred form, the method for manufacturing the high elastic synthetic yarn according to the invention comprises using a thermoplastic synthetic multi-filament having a potential crimpable property in which crimps are develop by suitable treatment in a relaxed condition, the filament not having been drawn, drawing the filament and twisting such filament in a range of twist multiplier from 900 to 10,000 in denier system in which a twist multiplier of $K=T\sqrt{D}$ where T is the turns of twist per meter and D is denier, is used and providing relaxation under suitable heat treament condition such as temperature from 80° C. to 250° C. The optimum temperature varies depending upon the heating medium employed, but it is from 110° C. to 150° C. for example, when carrying out with steam.

As the above-mentioned undrawn filament, the following multi-filaments of synthetic fibers having a potentially crimpable property in which crimps are developed by suitable treatment in a relaxed condition can be used preferably. In the following description, the term "composite fiber" is used to designate an individual filamentary fiber composed of two different component synthetic materials extending as distinct filamentary components along the length of the filament in adhering relationship.

1: In case of polyolefin fibers (1) Composite fiber spun from two kinds of propylene polymers in such a condition that before the drawing treatment at least one of the components of the composite fiber has β orientation of more than 0.2 and intrinsic viscosity $[\eta]_s$ of more than 1.2 and the difference of birefringence between the above two components is more than $5 \times 10^{-3}$, (2) Composite fiber spun from two kinds of propylene polymers in such a condition that before the drawing treatment one of said components of the composite fiber has an intrinsic viscosity $[\eta]_f$ from 1.4 to 3.0 and a birefringence X from $8 \times 10^{-3}$ to $27 \times 10^{-3}$, the other components have an intrinsic viscosity $[\eta]_f$ from 0.8 to 3.0 and a birefringence within a range shown by the zone a, b, c and d in FIG. 4 which is determined in accordance with the birefringence of component X in the undrawn filament.

(3) Multi-filament fibers composed of lateral distribution of fiber structure having eccentrical arrangement which are spun from a propylene polymers melt and has an intrinsic viscosity $[\eta]_f$ from 1.2 to 2.6 and a birefringence from $10 \times 10^{-3}$ to $30 \times 10^{-3}$ before the drawing treatment.

2: In case of acrylic fibers (1) Composite fiber manufactured in such a way that fibers are spun from one part of orifices of the spinneret in which two kinds of spinning solutions are simultaneously extruded, and one kind of spinning solution is extruded from the remaining part of orifices of the spinneret.

(2) Composite fiber manufactured in such a way that fibers are spun from all orifices of the spinneret so that two kinds of spinning solutions are extruded side-by-side.

3: Composite fiber composed of two kinds of polyamide, two kinds of polyester and polypropylene and polyamide or polyester can be used for the purpose of the invention.

Figure 4:
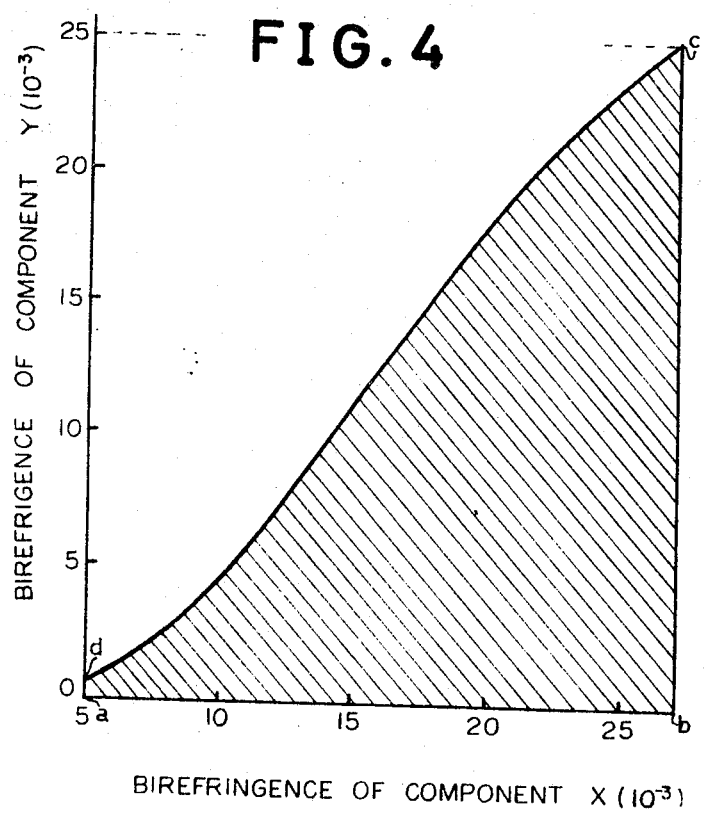
Figure 5:
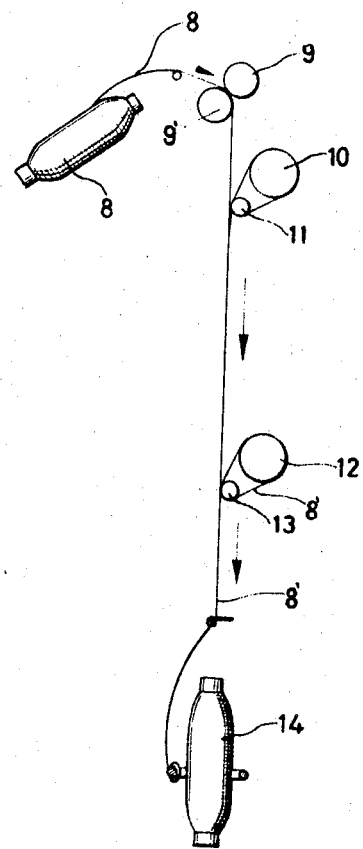
Figure 6:
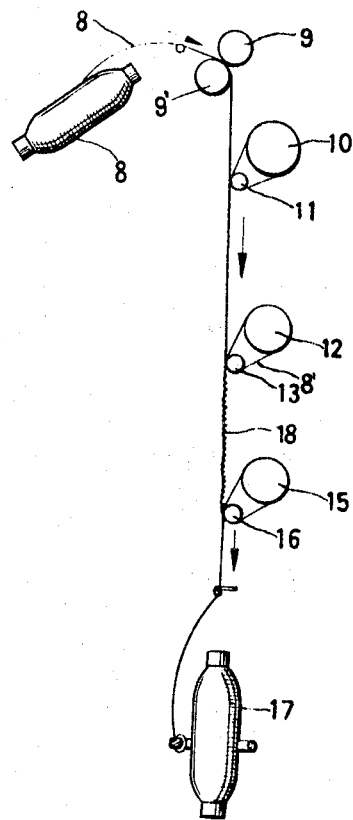
Figure 14:
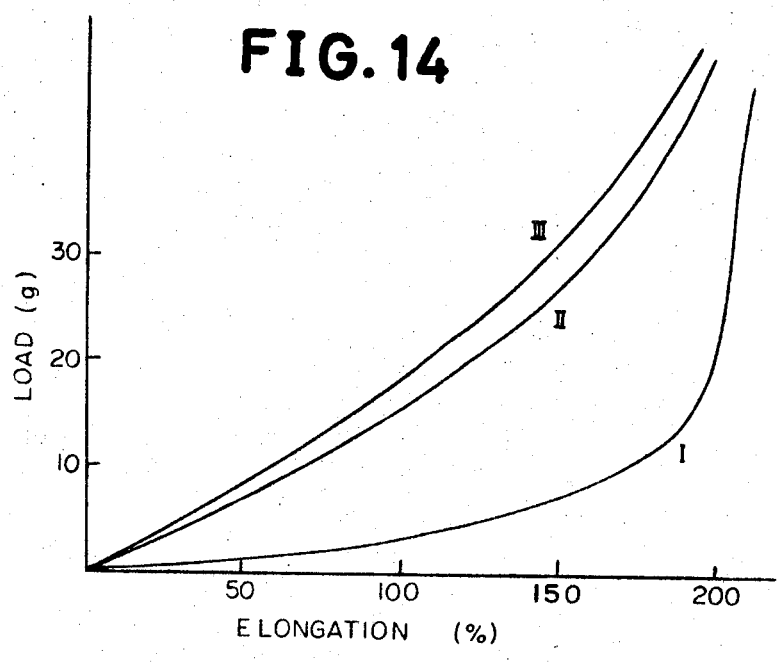
Figure 15:
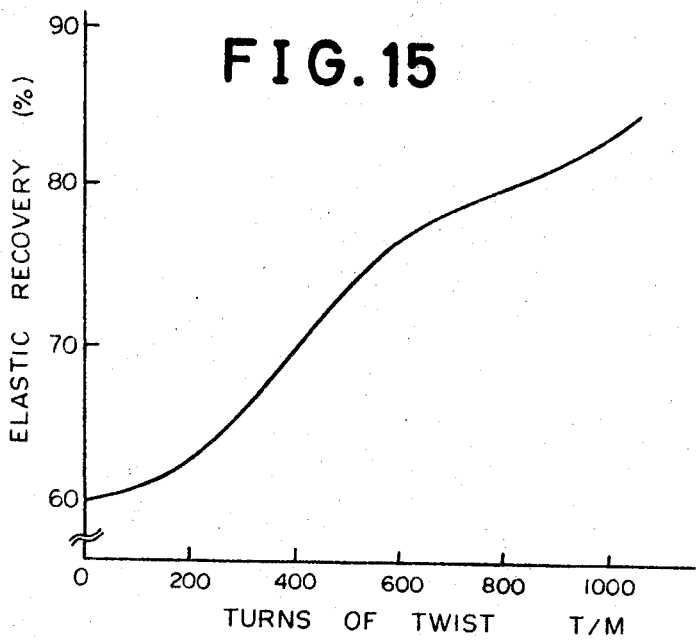

Reference is made herein after to the accompanying drawings wherein:

FIGS. 1, 2 and 3 are explanatory drawings to show the difference in shape between a mono-filament according to the present invention and the normal mono-filament, FIG. 4 is a diagrammatical drawing to show the relationship of birefringence between the component X and the component Y in the undrawn filament of the invention, FIGS. 5 and 6 are schematic drawings of equipments to draw for manufacturing high elastic crimped yarn according to the invention, FIGS. 7, 8, 9, 10, 11, 12 and 13 are schematic drawings to explain the differences in the shape and construction between the high elastic crimped yarns according to the invention and normal composite yarn, FIG. 14 is load-elongation curves of two kinds of elastic crimped yarns according to the present invention and normal bulky yarn, FIG. 15 is a diagram to show the relation between elastic recovery and turns of twits of the elastic crimped yarn according to the invention, FIG. 16 is a diagram to show the relation between crimp contraction and turns of twist of the elastic crimped yarn according to the invention.

Generally, when a multi-filament of thermoplastic synthetic fiber is twisted and subjected to so-called heat-set treatment, each mono-filament 1 deforms into an ordinary crimped shape, but not helically coiled shape 2 having approximately constant pitch as shown in the drawing of FIG. 1. And, when relaxation treatment is applied to a composite filament 3 having potentially crimpable property in which crimps are developed by suitable treatment, complex helically coiled shape of crimps comprising a portion of the helically coiled crimps 4 and a portion of reversible helically coiled crimps 5 are formed as shown in the drawing of FIG. 2. Due to the existence of two kinds of reversible helically coiled crimps in a filament, the so-called high bulkiness of a multi-filament comprising plurality of the later filaments is produced.

When composite fiber comprising plurality of filaments having potentially crimpable property is drawn and subjected to a relaxation treatment under a suitable condition, each composed filament tends to develop the above-mentioned helically coiled crimps. However, the moment due to the development of crimpiness disturbs the free development of the above-mentioned helically coiled crimps of the filament. When a portion having the pitch of helical coil by twist coincides with the potential pitch of helical coils shown in the drawing of FIG. 2, balanced helical coils of filament are developed in the portion of the multi-filament, while on the other hand, when a portion having the pitch of helical coil by twist does not coincide with the potential pitch of helical coils shown in the drawing of FIG. 2, unbalanced helical coils of filament are produced in the portion of the multi-filament.

Therefore, in order to provide a suitable twist to a multi-filament (especially to a composite fiber) having potentially crimpable property so as to develop balanced helical coils, uniform matched helically coiled crimps 7 can be developed in a filament 6 by a suitable treatment in a relaxed condition, as shown in the drawing of FIG. 3. Yarn thus obtained is so-called spring yarn and is of the present invention.

The turns of twists suitable for the purpose depend on the kind of synthetic fibers and proposed shape of the helically coiled crimps. Generally, a twist multiplier in denier system from 900 to 10,000 is practical, particularly, a twist multipler from 2,500 to 8,000 is effective.

The relaxation treatment by heat for developing the above-mentioned helically coiled crimps provides the effect of setting the shape of crimps. The temperature of the treatment should be chosen in accordance with the kind of thermoplastic synthetic fiber for this purpose, but in general, it is preferable to choose a temperature from 80° C. to 250° C. The above-mentioned temperature can be applied for the treatment for twisted multi-filament having potentially crimpable property or for woven or knitted fabrics made of the thermoplastic synthetic fibers having potentially crimpable property. The term potentially crimpable property is defined to mean that the filaments will assume a crimped configuration on being relaxed.

The potentially crimpable property of thermoplastic synthetic fiber varies according to the components of the fiber. FIG. 4 is a diagram to show the relationship of birefringence between the two component A and B in a composite fiber, spun from two kinds of propylene polymers in such a condition that before drawing treatment, one of said component A has an intrinsic viscosity $[\eta]_f$ from 1.4 to 3.0 and a birefrigence X from $8 \times 10^{-3}$ to $27 \times 10^{-3}$; the other component B has an intrinsic viscosity $[\eta]_f$ from 0.8 to 3.0 and a birefringence Y within a range shown by the zone $a$, $b$, $c$ and $d$ in FIG. 4 which is determined in accordance with the birefringence of component A in the undrawn filament. The pitch of the helical crimps of the filament becomes larger as the difference of the birefringnces X and Y increases. Therefore, the shape of the helically coiled crimps of the filament can be chosen by using a composite filament composed of two components having different birefringences. The so-called springy multi-filament yarn, particularly springy yarn having cylindrical hollow portion along the longitudinal axis of the yarn can be produced by selecting suitable undrawn filament and twist multiplier. The above-mentioned springy multi-filament having cylindrical hollow portion can be used for woven or knitted fabrics having bulkiness. Generally, woven or knitted fabrics made of the above-mentioned springy multi-filament yarn have excellent elastic recovering property.

In the above-mentioned method for manufacturing high elastic multi-filament yarn, drawing of the undrawn filaments is applied after the twisting of the filament. However, drawing of the filament can also be applied before the twisting of the filament. In both cases, when the pitch of twist provided by the twisting operation is smaller than the pitch of the helically coiled crimp of the potentially crimpable property, the unbalanced moment of the potential crimping is eliminated, and uniform, finer helically coiled crimps can be developed in the multi-filament of the thermoplastic synthetic yarn.

The following examples illustrate specific embodiments of the invention.

EXAMPLE 1

As isotactic polypropylene (hereinafter called polymer A) having an intrinsic viscosity $[\eta]_{G1}=2.2$ (when measured in tetralin at 135° C.) and the other isotactic polypropylene (hereinafter called polymer B) having an intrinsic viscosity $[\eta]_{G2}=1.4$ (when measured in tetralin at 135° C.) were melted by two extruders maintained at a temperature of 280° C., respectively, and spun from a spinneret having 30 holes maintained at the temperature of 260° C. at a spining capacity of 43 g./min. The composite ratio of the above-mentioned polymer components was 50:50 by weight. When the above-mentioned composite multi-filament was taken-up at a speed of 700 meters per minute, the component of the composite filament corresponding to polymer A is provided with β orientation of 0.24 and intrinsic viscosity $[\eta]_{f1}=1.50$, while the other component corresponding to polymer B is not provided with β orientation and has intrinsic viscosity $[\eta]_{f2}$ of 1.15. The resulting multi-filament was drawn at a drawing ratio of 3.5 times and drawing speed 190 m./min., by which a multi-filament of 90 denier was obtained. The produced filament of 90 denier was twisted with a suitable twisting machine, such as Italian type twister or ring twister, so as to provide the filament with twist of 400 turns per meter (twist multipler is about 3,800 in denier system), reeled and then subjected to heat-treatment with steam for 20 min., at 130° C. in a relaxed condition. As a result, twisted multi-filament comprising plurality of helically coiled filaments as shown in the drawing of FIG. 10 is obtained. The yarn thus obtained has excellent elastic properties.

EXAMPLE 2

Pellets of two polypropylene components $a$ and $b$ to which a stabilizer has been added and having different intrinsic viscosities (when measured in tetralin at 135° C.) and different birefringence values were melted by a pair of separate extruders at 255° C., respectively, and the melted polymers of polypropylene were fed to a spinneret having 30 holes maintained at 245° C. at the same speed by the respective gear pumps and were spun at the spinning capacity of 43 g./min., so as to produce a composite multi-fiament. When the spun fillament was taken up at a speed of 740 m./min., the undrawn multi-filament having maximum draw ratio of 5.0 times, intrinsic viscosities of two components $a$, $b$ corresponding to the above-mentioned two kinds of melt polymers, $[\eta]_a=1.14$, $[\eta]_b=1.16$; and birefringence of above two components $a$, $b$ $\Delta n_a=13 \times 10^{-3}$, $\Delta n_b=4 \times 10^{-3}$ was produced.

Figures 7, 8, 9:
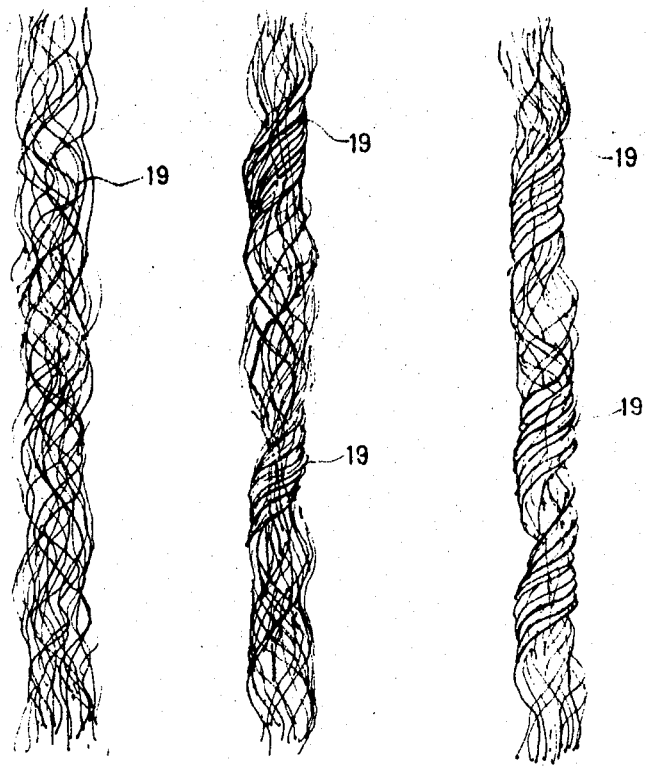

The resulting undrawn multi-filament was fed to a draw-twister as shown in FIG. 5 so as to draw the filaments at a draw ratio of 3.80 times at a drawing speed 190 m./min. and wound in a pirn with an original twist of 20 turns per meter. After the draw twisting, additional twist was applied to the drawn multi-filament in the same direction as the direction of the original twist with a suitable twisting machine at a spindle speed of 9800 r.p.m. so as to provide additional twist of 300 turns per meter (twist multiplier is about 2850 in denier system) to the filament and then reeled. After seasoning to stand for one day, the reeled multi-filament was subjected to heat-treatment with steam for 20 minutes at 130° in a relaxed state. By the above-mentioned treatment, a multi-filament comprising helically coiled filaments as shown in the drawing of FIG. 10 can be produced easily. If a multi-filament without above-mentioned additional twist is subjected to steam treatment, a multifilament having unbalanced and irregular helically coiled filaments as shown in the drawing of FIG. 7 is produced.

The crimp contraction of the high elastic crimped yarn (A) of polypropylene manufactured by the method of Example 2, crimped yarn (B) of polypropylene manufactured by the conventional false twist method, composite filament yarn (C) of polypropylene manufactured by developing a potentially crimpable property of the composite filament but without any twisting operation: and the elastic recovery of knitted fabrics of plain stitch with above-mentioned yarns respectively, are shown in the following table.

| Material (yarn) | Crimp contraction (percent) | Elastic recovery (percent) |
|---|---|---|
| A | 58 | 75 |
| B | 48 | 60 |
| C | 65 | 60 |

In the above table, "crimp contraction" is defined by the following equation:

$$\text{Crimp contraction in percent} = \frac{l_1 - l_2}{l_1} \times 100$$

where $l_1$ is the length of yarn (in mm.) measured under a load of 100 mg./denier, after taking off an initial load 1 m./denier at standard condition, $l_2$ is a length of the above-mentioned yarn but treated with steam at 95° C. for 20 minutes and dried, measured under a load of 1 mg./denier.

$$\text{Elastic recovery in percent} = \frac{L^1}{L^{100}} \times 100$$

where $L^{100}$ is recovered length (in mm.) of the above-identified knitted fabrics when the test piece of the fabrics is subjected to 100 repeated straining in a lateral direction of the fabrics such as 50 percent extension of the original width of the fabric by each straining, $L_1$ is recovered length (in mm.) of the above-identified knitted fabrics after the first straining when the test piece of the fabric is subjected to the above-mentioned repeated straining. As it is clear in the table, the elastic yarn A according to the invention has a slightly inferior crimpness in comparison with that of yarn B, but has better crimp contraction than that of yarn C, and the knitted fabrics made of the yarn A according to the invention have the best elastic recovery when compared with the other two fabrics.

EXAMPLE 3

Undrawn multi-filament of Example 1 was fed to a suitable twisting machine and twisted at a number of spindle revolutions of 8,000 r.p.m. so as to provide the filament with twist of 580 turns per meter. After seasoning the twisted filament to stand for one day, the twisted multi-filament was drawn to three times at a drawing speed 170 m./min. by using a draw twister as shown in FIG. 5. While winding up the multi-filament with the draw twister, the drawn multi-filament was twisted 20 turns per meter in the same direction of twist as that of the above-mentioned twisting operation by the twister and reeled. Total twisting number of the resultant multi-filament is 600 r.p.m. and twist multiplier is about 5700 in denier system. After seasoning to stand for one day, the resulting multi-filament was heat treated with steam for 20 minutes in a relaxed condition at a temperature of 130° C. The multi-filament produced having high elastic property according to the above-mentioned method shown in the drawing of FIG. 11 has more uniform helically coiled filaments when compared with the multi-filament subjected to twisting operation only after a drawing operation.

In the above-mentioned examples of Example 2 and Example 3, a wet treatment with hot water from 30° C. to 40° C. in which the reel of the multi-filament is simply at a stage before heat treatment with steam, is helpful for production more matched and uniform helically coiled crimps on each filament.

In the drawings of FIGS. 5 and 6, embodiments of drawing apparatus for drawing twisted undrawn multi-filament having potentially crimpable property as shown. In both drawings, twisted undrawn multi-filament 8 is fed to feed rollers 10, 11 through a pair of pinch rollers 9, 9' and passes around a pair of drawing rollers 12, 13 which bestow predetermined drawing to the passing filament 8'. After passing around the drawing rollers 12 and 13, in case the apparatus of FIG. 5 is used the drawn filament 8' is wound so as to form a pirn 14. On the other hand, in case of FIG. 6, a pair of relaxing rollers 15 and 16 are disposed in the succeeding path of the drawn filament 8', whereby the drawn filament 8' is fed to a relaxing field between the pair of drawing rollers 12 and 13, and the relaxing rollers 15 and 16 so as to provide the drawn filament with a relaxation of several percent in the relaxing field. The above-mentioned relaxing condition is obtained by over-feeding the filament by the drawing rollers 12 and 13 to the taking up speed of the relaxing rollers 15 and 16. After passing around the relaxing roller, the relaxed multi-filament is wound so as to form a pirn 17. By using the latter apparatus as shown in FIG. 6, more uniform helically coiled crimps 18 are developed densely on a multi-filament.

FIG. 14 shows load-elongation diagrams of an elastic yarn having high bulkiness according to the invention and a traditional high bulky elastic yarn. In FIG. 14, curves I, II, III represent load-elongation curves of high bulky elastic yarn (I) manufactured by a conventional method, high bulky elastic yarn (II) which was twisted by 300 turns per meter after drawing operation according to the invention, high bulky elastic yarn (III) which was drawn after twisting by 580 turns per meter, respectively. The distinguished differences between the shapes of these load-elongation curves are clearly shown in FIG. 14. According to the load-elongation curves, it may be explained that, when the yarns are loaded, the elastic yarn (I) deforms crimps of individual filaments so as to be made straight at the initial stage of loading, after having made the crimps straight, the filaments of the yarn (I) are subjected to stressing. Therefore, before making the crimps straight, the load necessary to stretch the crimps is comparatively small. On the other hand, the elastic yarns (II), (III) manufactured according to the present invention deform crimps of individual filaments while stressing the filaments. Therefore, the manufactured goods with the elastic yarn according to the invention have superior elastic properties than that of elastic yarn (I) manufactured by the conventional method.

EXAMPLE 4

After seasoning to stand for one day, an undrawn multi-filament of Example 2 was fed to a draw-twister and was drawn to three times at a drawing speed of 170 m./min. Turns of twist of the multi-filament during the winding operation was 20 turns per meter and the direction of twist was the same as that of the original twist of the multi-filament. After twisting wih a ring twister so as to apply additional twist to the multi-filamen by 100 turns per meter and reeling the additionally twisted filament and allowing the reeled multi-filament to stand for one day, the reeled multi-filament was heat-treated with steam for 20 minutes at a temperature of 130° C. in a relaxed condition. The elastic multi-filament comprising helically coiled filaments has a close structural feature as shown in the drawing of FIG. 10.

EXAMPLE 5

Pellets of a polypropylene composition $a$ prepared by adding a stabilizer and other additives, and having an intrinsic viscosity of 1.52 and a second polypropylene composition $b$ were melted by a pair of separate extruders at 225° C. and 330° C., respectively, and the melted polymers of polypropylene $a$ and $b$ were fed to a spinneret having 30 holes maintained at the temperature of 245° C. at the same speed through the respective gear pumps and were spun so as to produce a composite multi-filament. After drawing the spun multi-filament at drawing ratio of 3.98 at room temperature, the resulting multi-filament of 90 deniers was fed to an Italian type twister and was twisted by 100, 200, 400, 600, 800 and 1,000, respectively, turns of twist per meter. After reeling the twisted multi-filament, the reel of the multi-filament was heat-treated for 20 minutes at a temperature of 130° C. in a relaxed condition.

When the above-mentioned twisting operation is omitted, the heat-treated multi-filament has helically coiled crimps as shown in the drawing of FIG. 7. The structure of the multi-filaments shown in the drawings of FIGS. 8, 9, 10, 11, 12 and 13 correspond to the structure of the above-mentioned multi-filaments having twists of 100, 200, 400, 600, 800 and 1,000 turns per meter, respectively.

As it is clear in the drawings of FIGS. 8 and 9, in case less turns of twist is bestowed to the multi-filament, the potentially crimpable property of the filament does not balance with the moment of the twist and consequently unbalanced springy crimps 19 are developed on some portions of the multi-filament.

As shown in the drawings of FIGS. 10, 11 and 12, in case turns of twist from 400 to 800 are bestowed to the filament, the difference between the pitch of crimps according to the potentially crimpable property and the pitch of twist become small and the possibility of the twist moment coinciding with the above-mentioned potential crimp increases. Therefore the balanced and springy crimps 20 are developed uniformly on each filament of the multi-filament and consequently, multi-filaments 21, 22 and 23 having high bulkiness and excellent elastic recovery are obtained, as shown in FIGS. 10, 11 and 12. In case twist of more than 1,000 turns per meter is bestowed to the filament, the resulting multi-filament 24 shown in FIG. 13 still has soft handling quality and also so-called crispiness, springiness and fairly good elasticity, even though the excess twist disturbs free development of high bulkiness of the multi-filament.

FIGS. 15 and 16 are diagrams to show the mutual relation between the elastic recovery, crimpiness and turns of twist of the elastic yarns according to the invention. As it is clear in FIGS. 15 and 16, the elastic recovery of the elastic yarn according to the invention increases with increasing turns of twist per meter of the yarn, on the other hand, the crimpiness of the above-mentioned yarn decreases with increasing turns of twist per meter of the yarn.

EXAMPLE 6

An isotactic polypropylene having an intrinsic viscosity $[\eta]=2.3$ (when measured in tetralin at 135° C.) was spun at a taking-up speed of 600 r.p.m. and spinning temperature of 260° C. and undrawn multi-filament of 270 denier/24 filaments was produced. The undrawn multi-filament had a lateral distribution of fiber structure having eccentrical arrangement the intrinsic viscosity $[\eta]_f=1.6$, an orientation of birefringence $20 \times 10^{-3}$.

After rawing the above-mentioned undrawn multi-filament at a draw ratio of 3.0 corresponding to 75% of the maximum draw ratio of 4.2 and at a drawing temperature of 90° C., the drawn multi-filament was twisted with a ring twister so as to provide twist of 400 turns per meter (twist multiplier is about 3800 in denier system) reeled and subjected to a heat treatment with steam for 30 minutes at a temperature of 130° C. in a relaxed condition. The multi-filament obtained having an excellent helically coiled construction and elasticity is shown in FIG. 10.

EXAMPLE 7

A copolymer composed of 75 percent acrylonitrile and 25 percent vinylidene chloride with intrinsic velocity of 1.43 was dissolved in dimethyl acetamide to produce solution A having concentration of 25.1 percent. Another copolymer composed of 93 percent acrylonitrile and 7 percent vinyl acetate of intrinsic viscosity 1.62 was dissolved in dimethyl acetamide to produce solution B having concentration of 23 percent. Intrinsic viscosities of the polymers were measured in dimethyl for formamide solution at a temperature of 25° C. Solutions A and B were distributed through a distributor having 4 holes of 1.0 mm. diameter and combined at the front portion of a spinneret so as to combine the component of A solution and that of B solution at a ratio of 25:75 by weight. A spinneret plate was used so as to spin one kind of spinning solution from orifices while the two spinning solutions were spun from the remaining orifice of the spinneret into a coagulation bath which was composed of 40 percent dimethyl acetamide and 60 percent water and maintained at a temperature of 50° C. Filaments thus extruded were stretched 6.5 times in boiling water, washed with water and dried, and each filament separated. By the above-mentioned manufacturing method, a multi-filament of 20 deniers was produced. The resulting multi-filament was twisted with a conventional twisting machine at a spindle speed of 9,000 r.p.m., turns of twist of 400 turns per meter (twist multiplier is about 3800 in denier system), reeled and then heat-treated with steam at 145° C. for 20 minutes in a relaxed condition. The composite multi-filament produced has helically coiled elastic construction as shown in the drawing of FIG. 10.

EXAMPLE 8

A copolymer composed of 75 percent acrylonitrile and 25 percent vinylidene chloride with intrinsic viscosity of 1.43 was dissolved in dimethyl acetamide to produce solution A having concentration of 25.1 percent. Another copolymer composed of 93 percent acrylonitrile and 7 percent vinyl-acetate of intrinsic viscosity 1.62 was dissolved in dimethyl-acetamide to produce solution B having concentration of 23 percent. Intrinsic viscosities of the polymers were measured in dimethyl formamide solution at a temperature of 25° C. The solutions A and B were fed to a composite spinneret having 80 holes of 0.1 mm. diameter and spun from the spinneret into a coagulation bath which was composed of 55 percent dimethyl-acetamide and 45 percent water and maintained at a temperature of 40° C. The composite ratio of the abovementioned polymer components was 50:50 by weight. Filaments thus extruded were stretched 6.5 times in boiling water, washed with water and dried, and thus a multifilament of 200 deniers was obtained. The resulted multi-filament was twisted with a conventional twisting machine at a spindle rotation of 9,000 r.p.m., turns of twist of 600 turns per meter (twist multiplier is about 8500 in denier system), reeled and then heat-treated with steam at 145° C. for 20 minutes in a relaxed condition. The composite multifilament produced has helically coiled elastic construction as shown in the drawing of FIG. 11.

EXAMPLE 9

Pellet of polycaproamide having a specific viscosity of 1.00 (when measured by m-cresol solution at a concentration of 0.5 g./100 cc. and at a temperature of 30° C.) and another pellet of branched poly caproamide having a specific viscosity of 2.20 (when measured by m-cresol solution at a concentration of 0.5 g./100 cc. and a temperature of 30° C.) were melted at a temperature of 290° C., and spun from a spinneret having 24 holes of 0.5 mm. diameter under a controlled condition for maintaining the composite ratio 50:50 by weight, and taken up at 600 m./min. A multi-filament of 70 deniers was produced by drawing to 3.1 times in a dry-heating condition of 130° C. from the above-mentioned undrawn multi-filament, then twisted by a suitable twisting machine so as to provide twist of 800 turns per meter (twist multiplier is about 7600 in denier system) and reeled. The reel of the twisted multi-filament was heat treated at 170° C. for 10 minutes in a relaxed condition. The composite multi-filament produced having helically coiled elastic construction is shown in FIG. 12.

The crimp contraction of the high elastic crimped yarn of polyamide A according to the Example 9, crimped nylon yarn B manufactured by the conventional false twist method, and a composite yarn of polyamide C manufactured by developing a potentially crimpable property of the composite filament but without any twisting operation, the elastic recovery of knitted fabrics of plain stitch with above-mentioned yarns respectively, are shown in the following table.

| Material (yarn) | Crimp contraction (percent) | Elastic recovery (percent) |
| --- | --- | --- |
| A | 45 | 78 |
| B | 60 | 70 |
| C | 53 | 68 |

In the above table, the definitions of "crimp contraction" and "elastic recovery" are the same as those defined in the above Example 2. As is clear from the table, the knitted fabric made with high elastic yarn A according to the invention has excellent elastic recovery.

EXAMPLE 10

A pellet of isotactic polypropylene having an intrinsic viscosity of 1.9 (when measured in tetralin at 135° C.) prepared by adding 6% by weight of liquid paraffin and a pallet of polycaprolactam having a specific viscosity of 0.7 (when measured by m-cresol solution at a concentration of 0.5 g./100 cc. and at 30° C.) are melted separately and fed to a spinneret in separate condition and spun into a composite multi-filament at a spinning temperature of 265° C. and taking-up speed of 650 m./min. The composite filaments of the above-mentioned multi-filament comprises a core component spun from the melt of the polypropylene and a sheath component spun from the melt of the polycaprolactam which eccentrically surrounds the core component. The weight ratio of the core component to the sheath component was 30:70. The undrawn filament produced was treated at 100° C. for 5 minutes while maintaining the original length, then drawn to 2.5 times at 145° C., the drawn multi-filament of 150 denier was twisted by a twisting apparatus so as to provide twist of 600 turns per meter (twist multiplier is about 5700 in denier system), reeled and the reel of the twisted multi-filament was heat-treated at 140° C. with steam for 20 minutes. An elastic multi-filament having excellent helically coiled crimps as shown in the drawing of FIG. 11 was obtained.

EXAMPLE 11

A composite multi-filament was spun from a polyethylene terephthalate having an intrinsic viscosity of 0.66 in a mixed solvent composed of 50 percent by weight of phenol and 50 percent by weight of dichloroethane and a copolycondensate of polyethylene terephthalate having an intrinsic viscosity of 0.72 in which 6.5 mol percent of $\beta\beta'$-dihydroxy-$\beta'$-butoxyethoxymethyl diethylether on the basis of the acid group has been introduced at 270° C. and taken up at 700 m./min. The undrawn multi-filament produced was drawn to 4.1 times and while drawing the undrawn multi-filament, the filament was contacted to a plate maintained at 90° C. while passing over the plate and drawn multi-filament of 72 denier per 36 filaments was produced. Then the drawn filament was twisted to 800 turns per meter (twist multiplier is about 7600 in denier system) by using a conventional twisting apparatus, reeled and subjected to heat treatment at 140° C., for 10 minutes in a relaxed condition. The multi-filament produced has high elastic crimped yarn as shown in the drawing of FIG. 12.

What is claimed is:

1. Method for manufacturing high elastic crimped yarn which method comprises producing a multi-filament of thermoplastic synthetic composition, said multi-filament comprising asymmetrical individual composite fibers having a potentially crimpable property, drawing said multi-filament to about 2.5 to 6.5 times its undrawn length, twisting said multi-filament which was subjected to said drawing operation in a range of twist multiplier from 900 to 10,000 in the denier system, aging said twisted multi-filament, and thereafter subjecting said twisted multi-filament to heat treatment in relaxed condition at a range of temperatures from 80° C. to 250° C. to develop longitudinally arranged uniform helically coiled crimps in each said composite filament of said multi-filament to provide high elasticity.

2. Method for manufacturing high elastic crimped yarn, which method comprises producing a multi-filament of thermoplastic synthetic composition, said multi-filament comprising asymmetrical individual composite fibers having a potentially crimpable property, twisting said multi-filament in a range of twist multiplier from 900 to 10,000 in the denier system, drawing said multi-filament which was subjected to said twisting operation to about 2.5 to 6.5 times its undrawn length, aging said drawn multi-filament, and thereafter subjecting said drawn multi-filament to heat treatment in relaxed condition at a range of temperature from 80° C. to 250° C., to develop longitudinally arranged uniform helically coiled crimps in each said composite filament of said multi-filament.

3. Method for manufacturing high elastic crimped yarn which method comprises producing a multi-filament of thermoplastic synthetic composition, said multi-filament comprising asymmetrical individual composite fibers having a potentially crimpable property, twisting said multi-filament, drawing said multi-filament which was subjected to said twisting operation to about 2.5 to 6.5 times its undrawn length, retwisting said drawn multi-filament in a range of resultant twist multiplier from 900 to 10,000 in the denier system, aging said twisted multi-filament, and thereafter subjecting said multi-filament which was subjected to said additional twisting operation to heat treatment in relaxed condition at a range of temperature from 80° C. to 250° C., to develop longitudinally arranged uniform helically coiled crimps in each said composite filament of said multi-filament to provide high elasticity.

4. Method for manufacturing high elastic crimped yarn according to claim 1, further characterized by drawing an undrawn filament comprising multi-filament of polyolefin fiber which was not subjected to any drawing operation.

5. Method for manufacturing high elastic crimped yarn according to claim 1, further characterized by drawing an undrawn filament comprising multi-filament of polyamide fiber which was not subjected to any drawing operation.

6. Method for manufacturing high elastic crimped yarn according to claim 1, further characterized by drawing an undrawn filament comprising multi-filament of polyester fiber which was not subjected to any drawing operation.

7. Method for manufacturing high elastic crimped yarn according to claim 1, further characterized by drawing an undrawn filament comprising multi-filament of acrylic fiber which was not subjected to any drawing operation.

8. Method for manufacturing high elastic crimped yarn according to claim 1, further characterized by drawing an undrawn filament comprising multi-filament of composite fiber which was spun from a polypropylene and a polyamide by means of composite spinning and was not subjected to any drawing operation.

9. Method for manufacturing high elastic crimped yarn according to claim 1, further characterized by drawing an undrawn filament comprising multi-filament of composite fiber which was spun from a polypropylene and a polyester by means of composite spinning and was not subjected to any drawing operation.

10. Method for manufacturing high elastic crimped yarn according to claim 2, further characterized by twisting an undrawn filament comprising multi-filament of polyester fiber which was not subjected to any drawing operation.

11. Method for manufacturing high elastic crimped yarn according to claim 2, further characterized by twisting an undrawn filament comprising multi-filament of polyamide fiber which was not subjected to any drawing operation.

12. Method for manufacturing high elastic crimped yarn according to claim 2, further characterided by twisting an undrawn filament comprising multi-filament of polyester fiber which was not subjected to any drawing operation.

13. Method for manufacturing high elastic crimped yarn according to claim 2, further characterized by twisting an undrawn filament comprising multi-filament of acrylic fiber which was not subjected to any drawn operation.

14. Method for manufacturing high elastic crimped yarn according to claim 2, further characterized by twisting an undrawn filament comprising multi-filament of composite fiber which was spun from a polypropylene and a polyamide by means of composite spinning and was not subjected to any drawing operation.

15. Method for manufacturing high elastic crimped yarn according to claim 2, further characterized by twisting the undrawn filament comprising multi-filament of composite fiber which was spun from a polypropylene and a polyester by means of composite spinning and was not subjected to any drawing operation.

16. Method for manufacturing high elastic crimped yarn according to claim 3, further characterized by twisting an undrawn filament comprising multi-filament of polyolefin fiber which was not subjected to any drawing operation.

17. Method for manufacturing high elastic crimped yarn according to claim 3, further characterized by twisting an undrawn filament comprising multi-filament of polyamide fiber which was not subjected to any drawing operation.

18. Method for manufacturing high elastic crimped yarn according to claim 3, further characterized by twisting an undrawn fillament comprising multi-filament of polyester fiber which was not subjected to any drawing operation.

19. Method for manufacturing high elastic crimped yarn according to claim 3, further characterized by twisting an undrawn filament comprising multi-filament of acrylic fiber which was not subjected to any drawing operation.

20. Method for manufacturing high elastic crimped yarn according to claim 3, further characterized by twisting an undrawn filament comprising multi-filament of composite fiber which was spun from a polypropylene and a polyamide by means of composite spinning and was not subjected to any drawing operation.

21. Method for manufacturing high elastic crimped yarn according to claim 3, further characterized by twisting an undrawn filament comprising multi-filament of composite fiber which was spun from polypropylene and a polyester by means of composite spinning method and was not subjected to any drawing operation.

22. Method for manufacturing high elastic crimped yarn according to claim 1, further characterized by drawing an undrawn filament comprising multi-filament of composite polyolefin fiber which was spun from two kinds of propylene polymers in such a condition that before the drawing treatment at least one of the components of the composite fiber has $\beta$ orientation of more than 0.2 and an intrinsic viscosity $[\eta]_f$ of more than 1.2, the difference of birefringence between said two components is more than $5 \times 10^{-3}$.

23. Method for manufacturing high elastic crimped yarn according to claim 2, further characterized by twisting an undrawn filament comprising multi-filament of composite polyolefin fiber which was spun from two kinds of propylene polymers in such a condition that before the drawing treatment at least one of the components of the composite fiber has $\beta$ orientation of more than 0.2 and an intrinsic viscosity $[\eta]_f$ of more than 1.2, the difference of birefringence between said two components is more than $5 \times 10^{-3}$ 24. Method for manufacturing high elastic crimped yarn according to claim 3, further characterized by twisting an undrawn filament comprising multi-filament of composite polyolefin fiber which was spun from two kinds of propylene polymers in such a condition that before the drawing treatment at least one of the components of the composite fiber has $\beta$ orientation of more than 0.2 and an intrinsic viscosity $[\eta]_f$ of more than 1.2, the difference of birefringence between said two components is more than $5 \times 10^{-3}$.

25. Method for manufacturing high elastic crimped yarn according to claim 1, further characterized by drawing an undrawn filament comprising multi-filament of composite polyolefin fiber which was spun from two kinds of propylene polymers in such a condition that before the drawing treatment one of said components of the composite fiber has an intrinsic viscosity $[\eta]_f$ from 1.4 to 3.0 and a birefringence X from $8 \times 10^{-3}$, the other components have an intrinsic viscosity $[\eta]_f$ from 0.8 to 3.0 and a birefringence Y within a range shown by the zone $a$, $b$, $c$, and $d$ in FIG. 4 which is determined in accordance with the birefringence of component X in the undrawn filament.

26. Method for manufacturing high elastic crimped yarns according to claim 2, further characterized by twisting an undrawn filament comprising multi-filament of composite polyolefin fiber which was spun from two kinds of propylene polymers in such a condition that before the drawing treatment one of said components of the composite fiber has an intrinsic viscosity $[\eta]_f$ from 1.4 to 3.0, and a birefringence X from $8 \times 10^{-3}$ to $27 \times 10^{-3}$, the other components have an intrinsic viscosity $[\eta]_f$ from 0.8 to 3.0 and a birefringence Y within in a range shown by the zone $a$, $b$, $c$ and $d$ in FIG. 4 which is determined in accordance with the birefringence of component X in the undrawn filament.

27. Method for manufacturing high elastic crimped yarn according to claim 3, further characterized by twisting an undrawn filament comprising multi-filament of composite polyolefin fiber which was spun from two kinds of propylene polymers in such a condition that before the drawing treatment one of said components of the composite fiber has an intrinsic viscosity $[\eta]_f$ 1.4 to 3.0, and a birefringence X from $8 \times 10^{-3}$ to $27 \times 10^{-3}$, the other component has an intrinsic viscosity $[\eta]_f$ from 0.8 to 3.0 and a birefringence Y within in a range shown by the zone $a$, $b$, $c$ and $d$ in FIG. 4 which is determined in accordance with the birefringence of component X in the undrawn filament.

28. Method for manufacturing high elastic crimped yarn according ot claim 1, further characterized by drawing an undrawn filament comprising multi-filament of polyolefin fiber which is composed of lateral distribution of fiber structure having eccentrical arrangement which are spun from a propylene polymers melt, which has an intrinsic viscosity $[\eta]_f$ from 1.2 to 2.6 and a birefringence. from $10 \times 10^{-3}$ to $30 \times 10^{-3}$ before the drawing treatment.

29. Method for manufacturing high elastic crimped yarn according to claim 2, further characterized by twisting an undrawn filament comprising multi-filament of polyolefin fiber which is composed of lateral distribution of fiber structure having eccentrical arrangement which are spun from a propylene polymers melt, which has an intrinsic viscosity $[\eta]_f$ from 1.2 to 2.6 and birefringence from $10 \times 10^{-3}$ to $30 \times 10^{-3}$ before the drawing treatment.

30. Method for manufacturing high elastic crimped yarn according to claim 3, further characterized by twisting an undrawn filament comprising multi-filament of polyolefin fiber which is composed of lateral distribution of fiber structure having eccentrical arrangement which are spun from a propylene polymer which has an intrinsic viscosity $[\eta]_f$ from 1.2 to 2.6 and a birefringence from $10 \times 10^{-3}$ to $30 \times 10^{-3}$ before the drawing treatment.

31. Method for manufacturing elastic crimped yarn according to claim 1, further characterized by drawing a filament comprising multi-filament of composite acrylic fiber spun from one part of orifices of the spinneret two kinds of spinning solutions are simultaneously extruded and the remaining parts of orifices of the spinneret one kind of spinning solution is extruded.

32. Method for manufacturing high elastic crimped yarn according to claim 1, further characterized by drawing an undrawn filament, comprising multi-filament of composite acrylic fiber spun from all orifices of the spinneret two kinds of spinning solutions are extruded side-by-side.

33. Method for manufacturing high elastic crimped yarn according to claim 1, in which said multi-filament is twisted in a range of twist multipliers from 2,500 to 8,000 in the denier system.

34. Method for manufacturing high elastic crimped yarn according to claim 2, in which said multi-filament is twisted in a range of twist multipliers from 2,500 to 8,000 in the denier system.

35. Method for manufacturing high elastic crimped yarn according to claim 3, in which said multi-filament is twisted in a range of twist multipliers from 2,500 to 8,000 in the denier system.

36. High elastic multi-filament synthetic yarn produced by the method of claim 1.

37. High elastic multi-filament synthetic yarn produced by the method of claim 2.

38. High elastic multi-filament synthetic yarn produced by the method of claim 3.

References Cited

UNITED STATES PATENTS

| | | | |
|---|---|---|---|
| 2,766,505 | 10/1956 | Weiss | 57—157 XR |
| 2,777,277 | 1/1957 | Charlois | 57—157 XR |
| 2,778,090 | 1/1957 | Hasler | 28—72 |
| 2,962,857 | 12/1960 | Wood et al. | 57—157 |
| 3,118,011 | 1/1964 | Breen. | |
| 3,117,362 | 1/1964 | Breen. | |
| 3,188,689 | 6/1965 | Breen. | |
| 3,264,390 | 8/1966 | Tanner | 264—171 |
| 3,343,364 | 9/1967 | McIntosh et al. | 57—157 |

FOREIGN PATENTS

| | | |
|---|---|---|
| 833,491 | 4/1960 | Great Britain. |
| 969,110 | 9/1964 | Great Britain. |

STANLEY N. GILREATH, *Primary Examiner.*

WERNER H. SCHROEDER, *Assistant Examiner.*

U.S. Cl. X.R.

28—72; 57—140; 264—103, 171, 168, 290, 210